United States Patent
Mildner et al.

(10) Patent No.: US 9,573,628 B2
(45) Date of Patent: Feb. 21, 2017

(54) VEHICLE BODY WITH STRUCTURAL COMPONENT

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 14/469,416

(22) Filed: Aug. 26, 2014

(65) Prior Publication Data
US 2015/0054308 A1    Feb. 26, 2015

(30) Foreign Application Priority Data
Aug. 26, 2013  (DE) .................. 10 2013 014 209

(51) Int. Cl.
*B62D 25/08* (2006.01)
*B62D 27/02* (2006.01)

(52) U.S. Cl.
CPC ........... *B62D 27/023* (2013.01); *B62D 25/082* (2013.01)

(58) Field of Classification Search
CPC ............................ B62D 25/082; B62D 27/023
See application file for complete search history.

(56) References Cited

U.S. PATENT DOCUMENTS

| | | | |
|---|---|---|---|
| 5,031,958 A | 7/1991 | Fujita et al. | |
| 5,244,248 A | 9/1993 | Bovellan | |
| 5,346,276 A | 9/1994 | Enning et al. | |
| 8,789,877 B2 * | 7/2014 | Ohnaka | B62D 21/152 296/187.09 |
| 2009/0230665 A1 * | 9/2009 | Tamura | B62D 25/088 280/785 |
| 2012/0153679 A1 | 6/2012 | Yasuhara et al. | |

FOREIGN PATENT DOCUMENTS

| | | |
|---|---|---|
| DE | 19630647 A1 | 2/1998 |
| DE | 102004050102 A1 | 6/2005 |
| DE | 102009042064 A1 | 3/2011 |
| DE | 102011101389 A1 | 1/2012 |
| JP | 2004203238 A | 7/2004 |
| JP | 2009096314 A | 5/2009 |
| WO | 2012114824 A1 | 8/2012 |
| WO | 2014003418 A1 | 1/2014 |

OTHER PUBLICATIONS

UKIPO, British Search Report for Application No. 1412104.0, dated Jan. 14, 2015.

* cited by examiner

*Primary Examiner* — Glenn Dayoan
*Assistant Examiner* — Melissa A Black
(74) *Attorney, Agent, or Firm* — Lorenz & Kopf LLP

(57) ABSTRACT

The present disclosure relates to a front structure of a vehicle body having a wheel installation strut and a side member which flanks an interior defined by the front car. The side member has a convex surface, by means of which it is fastened to an end of the wheel installation strut in multiple points. At least one point is offset relative to the other points towards the interior. As a result, a front structure with good stiffness for improved occupant protection can be provided, which can also be assembled in a simple manner.

16 Claims, 4 Drawing Sheets

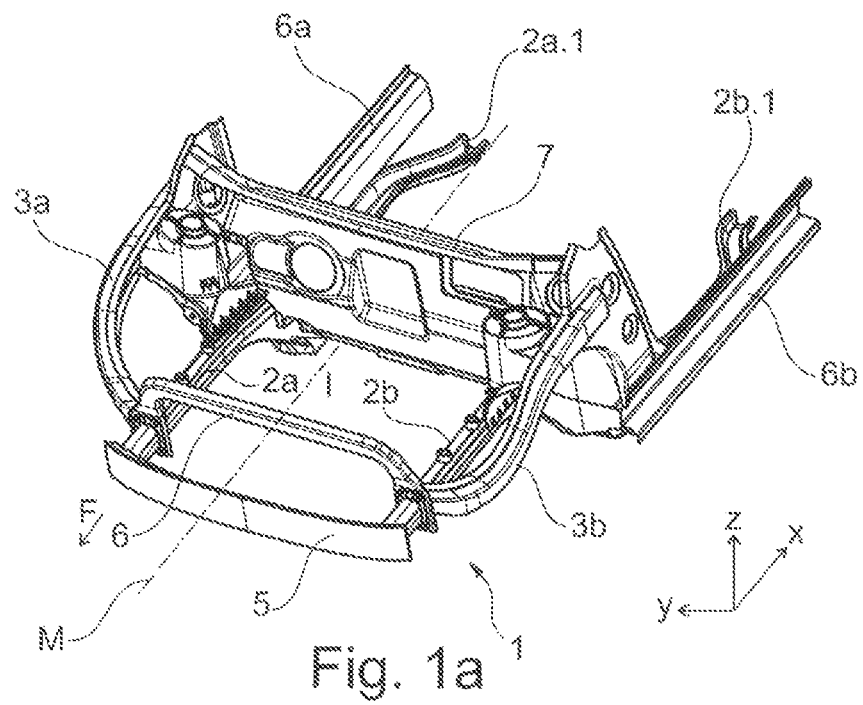
Fig. 1a
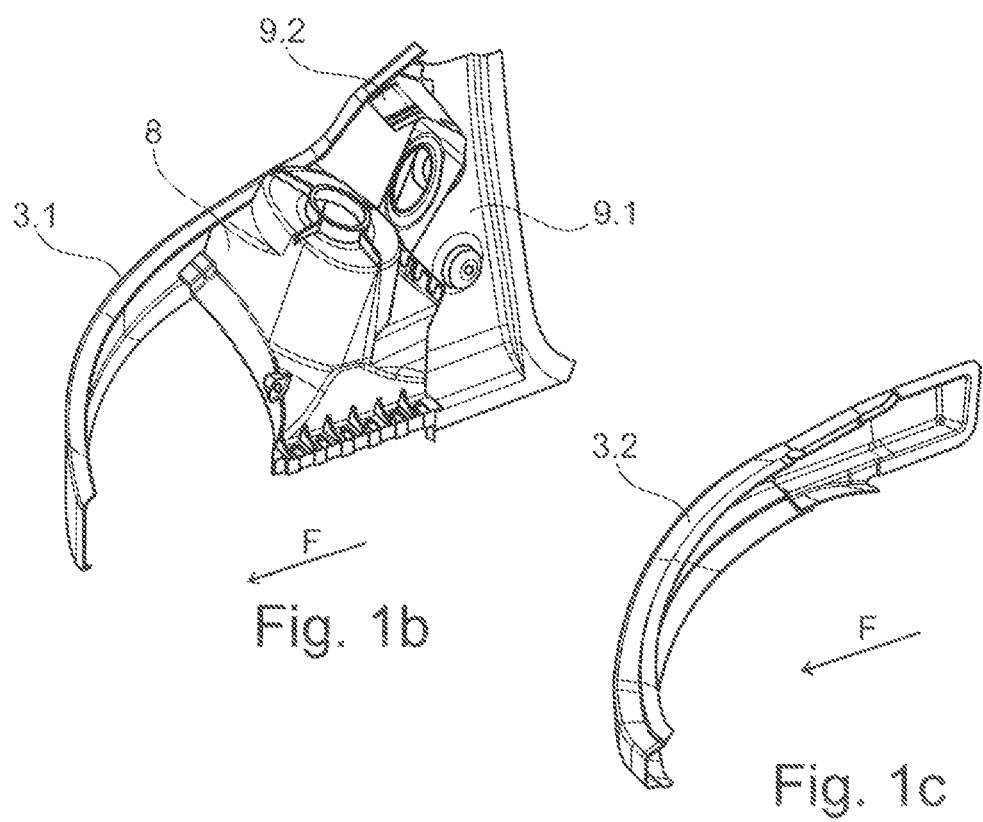
Fig. 1b
Fig. 1c

VEHICLE BODY WITH STRUCTURAL COMPONENT

CROSS REFERENCE TO RELATED APPLICATION

This application claims priority to German Patent Application No. 102013014209.1 filed Aug. 26, 2013, which is incorporated herein by reference in its entirety.

TECHNICAL FIELD

The technical field relates to a front structure of a vehicle body.

BACKGROUND

The German disclosure publication DE 10 2009 042 064 A1 shows a body front structure with a wheel installation strut and a side member connected thereto. A flat welding flange forms an interface between side member and wheel installations strut. The front frame and the wheel installation strut abut one another in the region of the welding flange and are welded to one another in a plane. If, during an accident, the front car is deformed and side member and wheel installation strut are twisted against one another in the process, the welded connection is substantially subjected to tensile loading perpendicularly to the surfaces of side member and wheel installation strut touching one another.

SUMMARY

In accordance with the present disclosure a front body structure is provided which is improved with respect to occupant protection and stability, and which can preferably also be produced in a simple manner.

According to a configuration of the present disclosure, a front car of a vehicle body with a wheel installation strut and a side member is provided, which flanks an interior of the front car. An end of the wheel installation strut is fastened at multiple points of a surface of the side member, the surface normals of which deviate from one another. Thus, all welding spots are never purely subjected to tensile loading simultaneously, and at least one of the welding spots is also subjected to shearing. While the tensile forces which are perpendicular to the surfaces of wheel installation strut and side member touching one another also deform the surfaces but can then concentrate on and destroy small regions of a welded connection. The surfaces are hardly deformed by the shearing forces which are parallel to these, and the loading is approximately evenly distributed over the entire extent of the welded connection so that the probability that the connection should fail is low.

The surface of the side member can be convex in order to accommodate the points with the surface normals deviating from one another in confined space. Offsetting at least one of the points with respect to the other one towards the interior can contribute to the stiffness of the connection of the side member to the wheel installation strut. The angles defined by the various surface normals should reach at least 90°, so that a force which subjects one of the points purely to tensile loading produces a shearing load on at least one other point. Angles of up to 180° can be practical. Preferably, the fastening in the points is a materially-joined connection, in particular a welded connection or a bonded connection. Optionally, multiple fastening types can be combined with one another.

According to an advantageous embodiment, at least one of the points is arranged on a top or bottom side of the side member. Because of this, torsional or bending forces can be better transmitted and the fastening points can be loaded in different directions of force application.

According to an advantageous embodiment, at least one of the points (in the mounted state of the side member) is arranged on an at least approximately horizontally oriented face of the side member. Preferably, the horizontal face forms a part of the top or bottom side. On the horizontal face, forces can be transmitted over a large area between the side member and the wheel installation strut. The fastening points can be parts of an extended connection, in particular welded or bonded connections.

According to an advantageous embodiment, the wheel installation strut includes an elongated hollow body and a structural component with a flange.

The previously mentioned object is also solved by a front car of a vehicle body which is embodied with a wheel installation strut and a side member. The wheel installation strut includes a structural component and an elongated hollow body. The structural component is plug-connected to the elongated hollow body and includes a flange, which is fastened to a convex surface of the side member. The sub-division into hollow body and structural component allows solely producing the structural component, in particular its flange, with a close tolerance so that it can enter into a fixed connection with the points of the side member. The hollow body can be cost-effectively produced with further tolerance.

According to an advantageous embodiment, the flange includes flange portions with surfaces facing one another. This makes possible a pincer-like engaging about the side member. Because of this, the fastening points can be arranged at a greater distance from one another on the outside of the side member, which supplies good stability and their surface normals can define a large angle, near 180°.

At least two of the flange portions can be formed through surfaces which are at least approximately oriented parallel to one another. Because of this, fastening to a top or bottom side, in particular to a horizontal face of the side member can take place in a simple manner. The flange portions can be formed as two straps located opposite one another, which in each case protrude in the direction of the longitudinal axis or in the direction of the side member and are connected to a top and/or bottom side of the side member in the at least one point. The flange preferably includes multiple facets, which are oriented at an angle to one another. Because of this, the stability of the structural component can be increased, in particular also with respect to a force acting in transverse direction (perpendicular to the driving direction), which can then be transmitted from the facets as tensile or compressive force.

The connection between hollow body and structural component can be established through a pin of the structural component, which is inserted into the hollow body. The pin can be formed hollow, in particular cup-like, typically with a bottom and a circumferential wall. This allows an economical production of the structural component, in particular by deep-drawing from a flat material cutting.

According to an advantageous embodiment, an opening is formed in the bottom. By creating the opening prior to the deep-drawing and widening it during the deep-drawing, a reduction of the wall thickness of the circumferential wall during the deep-drawing can be minimized, which benefits the load capacity, in particular the torsional strength of the structural component. The opening should not take up the entire extent of the bottom; a bottom region which annularly extends about the opening improves the stability of the structural component.

The pin can be tapered in order to facilitate a provisional fastening in the hollow body through clamping/wedging. The pin can have a non-round cross section in order to be able to engage in the hollow body in a torsionally fixed manner. A rectangular or trapezoidal cross-sectional shape is particularly suitable in order to fill out the free cross section of a hollow body produced in a manner that is known for conventional wheel installation struts by welding two deep-drawn sheets together along their longitudinal edges.

The side member can be a hydroformed part. Hydroforming makes possible producing a side member with a cross section that is variable over its length from a one-piece hollow profile portion. Because of this, the welded flanges which project at the top and bottom and which are usual with side members constructed in two parts are obsolete because of this, which render fastening the flange of the structural component more difficult or limit its extent.

According to an advantageous embodiment, the side member carries an anchor plate at an end. An inner hollow space of the side member is accessible through a passage of the anchor plate. Because of this, a tool, preferably a welding tool can connect both the side member to the wheel installation strut and also the anchor plate to the side member in a method step.

A method for assembling the front car may include the following: a) providing a hollow body; b) providing a structural component; and c) connecting the structural component to the hollow body to form a wheel installation strut. Preferably, connecting the structural component to the hollow body takes place by inserting or plugging the structural component into the hollow body, in particular a pin of the structural component is brought to lie against a corresponding inner surface area of the hollow body. Here, a reinforced end of the wheel installation strut can be formed by fastening the pin to the hollow body.

Preferably, a materially-joined connecting of the pin to the inner surface area, for example bonding, preferably welding, in particular spot welding in circumferentially arranged welding spots takes place following the insertion.

The method further includes providing a side member and fastening the structural component to the side member in multiple fastening points which are offset relative to one another and relative to an interior of the front car can take place. Preferably, connecting is effected through material joining, in particular through a joining method, e.g. by welding.

BRIEF DESCRIPTION OF THE DRAWINGS

The present disclosure will hereinafter be described in conjunction with the following drawing figures, wherein like numerals denote like elements.

FIG. 1a shows a schematic perspective view of a front car of a vehicle body;

FIG. 1b shows a schematic perspective view of a part region of the front car shown in FIG. 1a;

FIG. 1c shows a schematic perspective view of a part of a wheel installation strut, which forms a part of the front part shown in FIG. 1a;

DETAILED DESCRIPTION

Figure 2:
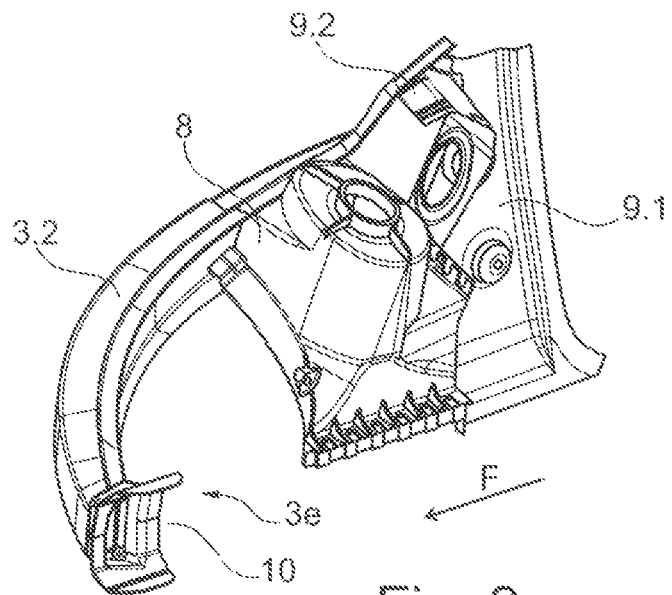
FIG. 2 shows a schematic perspective view of a part region of the front car shown in FIG. 1a with a structural component mounted on a wheel installation strut of the front car according to an exemplary embodiment of the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1a shows a front car 1 of a vehicle body, which includes a right side member 2a and a left side member 2b in travelling direction F. The front car 1 defines or delimits an interior I, in which for example an engine can be arranged. The side members 2a, 2b are each connected to a wheel installation strut 3a, 3b. A lock cross member 4 is arranged together with a bumper cross member 5 in a bow region of the front car 1 and connects the two side members 2a, 2b. A front wall 7 forms a boundary of the front car 1 in travelling direction F. The side members 2a, 2b or wheel installation struts 3a, 3b are each assembled with an inner sill structure 6a, 6b and a side member extensions 2a.1, 2b.1 respectively. The side members 2a, 2b of the front car 1 are oriented along a central longitudinal axis M, which extends in the travelling direction F (against an x-direction of the shown coordinate system). The wheel installation struts 3a, 3b are arranged at the interface to the respective side member 2a, 2b approximately perpendicularly to the central longitudinal axis M running in the y-direction of the shown coordinate system (at an angle of 75°-90°).

FIG. 1b shows an inner strut 3.1 of the wheel installation strut shown in FIG. 1a. The inner strut 3.1 is connected to a spring strut mounting 8. Furthermore, a lateral front wall 9.1 and a lateral windshield mounting 9.2 are shown, each of which form part of the front car shown in FIG. 1a. FIG. 1c shows an outer strut 3.2 which is provided in order to be joined to the inner strut 3.1 on the outside and with it form a hollow body of the wheel installation strut.

FIG. 2 shows the components shown in FIG. 1b and the outer strut 3.2 shown in FIG. 1c, which is mounted to the inner strut 3.1 on the outside and with it forms the hollow body designated 3e here. A structural component 10 engages into an open front end of the hollow body 3e. The structural component 10 can be optionally arranged initially on the inner strut 3.1 before the outer strut 3.2 is arranged on the inner strut 3.1, or initially on the outer strut 3.2, before the outer strut 3.2 is arranged on the inner strut 3.1. The outer strut 3.2 can also be arranged on the inner strut 3.1 in order to subsequently introduce the structural component 10 between the two struts 3.1, 3.2. Preferably, the struts 3.1, 3.2 are initially connected to one another in order to subsequently connect the structural component 10 to at least one of the struts 3.1, 3.2, preferably to both.

Figure 3:
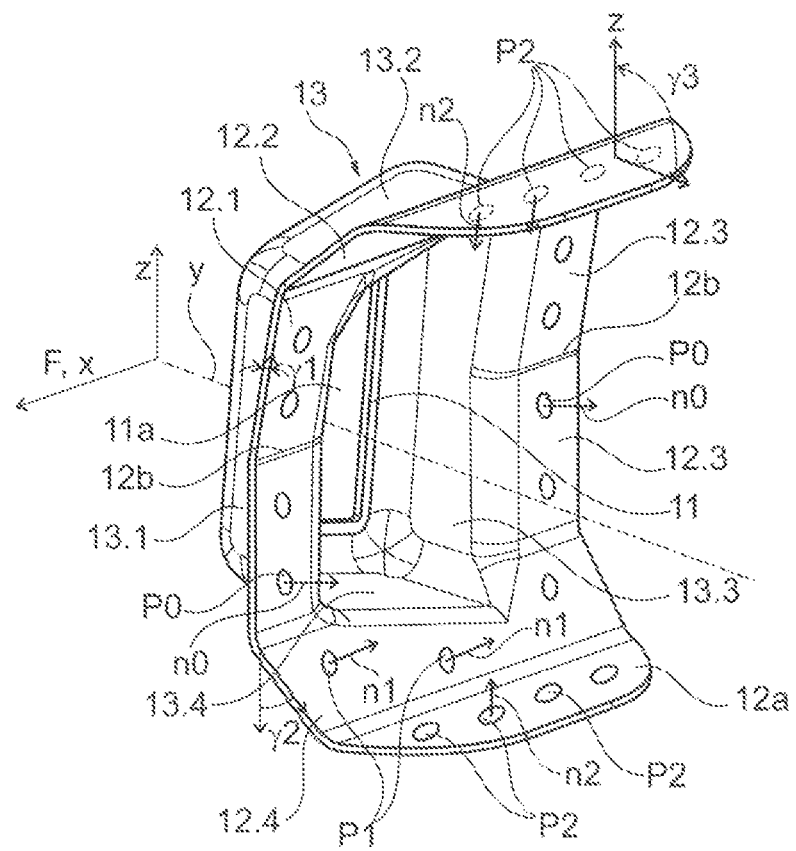
FIG. 3 shows a schematic perspective detail view of the structural component shown in FIG. 2.

FIG. 3 shows the structural component 10 in detail, in particular in an arrangement with respect to the travelling direction F, in which it can be connected to a wheel installation strut (not shown). The geometry of the structural component 10 can be described as a cup or hat shape, which is substantially formed by a pin 13, in particular a circumferential wall and a flange 12. The pin 13 forms a hat crown of the hat shape and the flange 12 forms a brim of the hat shape.

The pin 13 is subdivided into four wall portions 13.1, 13.2, 13.3, 13.4 and the flange 12 is subdivided into four flange portions 12.1, 12.2, 12.3, 12.4. The individual portions merge into one another, wherein the structural component 10 is embodied as a deep-drawn part. The pin 13 is delimited by a bottom or hat lid 11, in which an opening 11a is formed. The wall of the pin 13 is circumferentially formed about the longitudinal axis Y, which in the installed state of the structural component 10 extends transversely to the travelling direction F in the y-direction of the shown coordinate system.

Here, the flange 12 is arranged at three different angles γ1, γ2, γ3 to a z-direction or an xz-plane. A first flange portion 12.1 or third flange portion 12.3 is arranged at an angle γ1 to the xz-plane, a second flange portion 12.2 or fourth flange portion 12.4 at an angle γ2, and a protruding strap 12a (each at an angle γ3). Here, two straps 12a located opposite one another are provided. The protruding straps 12a are arranged at least approximately parallel to the Y-longitudinal axis and extend in x-direction along the entire lateral length of the structural component 10. Because of this, fastening points P2 can be provided in an x-direction over a large length portion, in particular welding spots, as a result of which the connection is made stronger, in particular also with respect to torsion. The fastening points P2 in this case are arranged in locations in which the structural component 10 has a surface normal n2. The exact arrangement of the fastening points P2 on the respective face is only exemplary indicated here.

The brim of the hat of the structural component 10 in this case is formed by a part of the flange 12, which is arranged between the pin 13 and the protruding straps 12a. The protruding straps 12a project in a direction opposite to the hat crown or the pin 13, i.e. facing away from the hat crown. Optionally, the protruding straps 12a can extend at an angle to the longitudinal axis Y and/or are oriented at least approximately in the same direction as the wall of the pin 13.

The first angle γ1 here is preferably located in a range from 0 to 25 degrees, more preferably 10 to 15 degrees. The second angle γ2 is preferably in the range from 25 to 65 degrees, more preferably 35 to 55 degrees, and in particular 45 degrees. The third angle γ3 is preferably in the range from 65 to 90 degrees, and more preferably 80 to 85 degrees.

On the first and third flange portion 12.1 and 12.3 respectively, fastening points P0 are indicated, via which the structural component 10 can be connected to a flank of a side member (not shown), in particular in a materially joined manner. The fastening points P0 are arranged in locations in which the structural component 10 has a surface normal n0, which deviates from the surface normal n2. The exact arrangement of the fastening points P0 on the respective face is only exemplarily indicated here.

Furthermore, fastening points P1 are indicated on the fourth flange portion 12.4. The fastening points P1 are arranged in locations in which the structural component 10 has a surface normal n1, which deviates from the surface normal n0 and n2 respectively. The exact arrangement of the fastening point P1 on the respective face is only exemplarily indicated here.

On the first and third flange portion 12.1, 12.3 respectively, a bend or a stiffening region 12b is provided, by means of which the structural component 10 has greater stability and strength, in particular with respect to forces acting in y-direction. Through the bend, the respective flange portion 12.1, 12.3 can be subdivided into multiple facets corresponding to the geometry of the side member, which make possible an arrangement of fastening points P0 in different planes.

Figure 4:
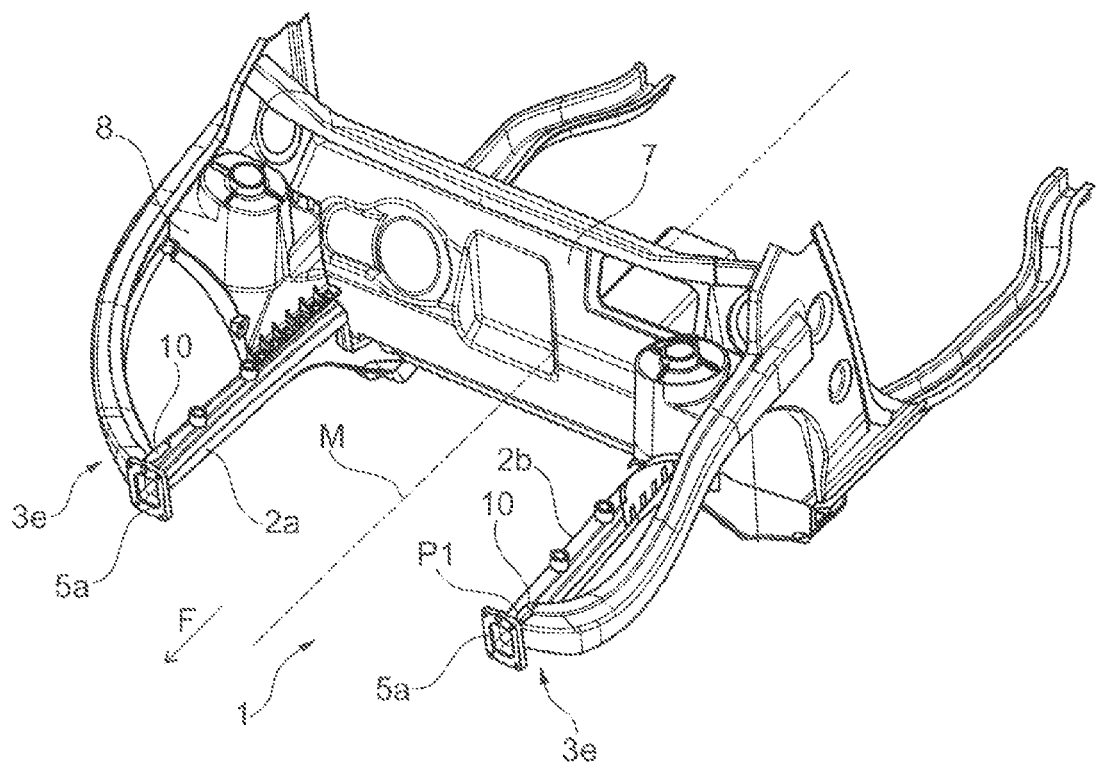
FIG. 4 shows a schematic perspective view of a part of the front car shown in FIG. 1a, wherein a structural component each according to an exemplary embodiment of the present disclosure is mounted between a wheel installation strut and a side member of the front car.

In FIG. 4, the side members 2a, 2b are noticeable, which are each connected by means of the structural component 10 and one of the wheel installation struts 3a, 3b respectively. The structural components 10 are each arranged in a hollow body 3e and the respective side member 2a, 2b laterally comes to lie against an outer surface area with a bottom side of the flange of the corresponding structural component 10. An anchor plate 5a which includes a passage 5b is connected to the side members 2a, 2b.

Figure 5:
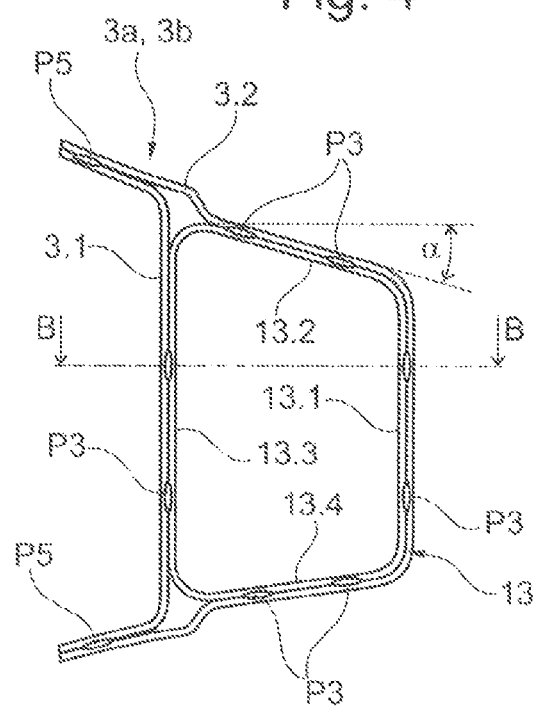
FIG. 5 shows a schematic sectional view according to the section A-A indicated in FIG. 2 through a wheel installation strut and a structural component according to an exemplary embodiment of the present disclosure.

FIG. 5 shows in detail the arrangement of the structural component 10 in the wheel installation strut 3a, 3b. A first, second and fourth wall portion 13.1, 13.2, 13.4 of the structural component 10 come to lie against an inner surface of the outer strut 3.2 of the wheel installation strut 3a, 3b and a third wall portion 13.3 comes to lie against an outer surface of the inner strut 3.1 of the wheel installation strut 3a, 3b. The cross-sectional geometry of the hat crown 13 of the structural component 10 is trapezoidal and corresponds to the geometry of the hollow body, which is formed by the two struts 3.1, 3.2. The structural component 10 merges into the hollow body on all wall portions 13.1, 13.2, 13.3, 13.4. Each wall portion 13.1, 13.2, 13.3, 13.4 is connected to the corresponding surface of the wheel installation strut 3a, 3b in a materially joined manner, preferably each via two welding points or welding spots P3. The two braces 3.1, 3.2 are likewise connected to one another via welding spots P5. The structural component 10 supplies a double-walled structure, in particular a reinforced end of the wheel installation strut. The second and fourth wall portion 13.2, 13.4 are arranged at an angle a with respect to the x-direction. The first and third wall portion 13.1, 13.3 are arranged in z-direction. The angle a here corresponds at least approximately to the orientation of the portions of the wheel installation strut, on which the welding spots P5 are provided. Because of this, a direction of force application can be defined between the side member (not shown) and the wheel installation strut. The structural component 10 thus supplies an interface with definable lines of force application.

Figure 6A:
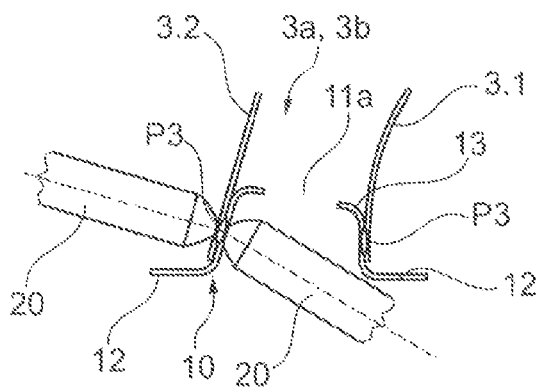
FIG. 6a shows a schematic sectional view according to the section B-B indicated in FIG. 5, with an assembly tool in a first position.

In FIG. 6a it is shown how a welding tool 20 can be arranged in order to connect the structural component 10 to a hollow body of the wheel installation strut 3a, 3b, in order to form a reinforced end of the wheel installation strut 3a, 3b. Two welding electrodes can engage about the wheel installation strut 3a, 3b and the structural component 10, specifically the walls 13 of the structural component 10, and place the welding spots P3. The welding electrode which is arranged inside in the structural component 10 in this case is guided up to the structural component 10 on the side of the brim of the hat or the flange 12.

Figure 6B:
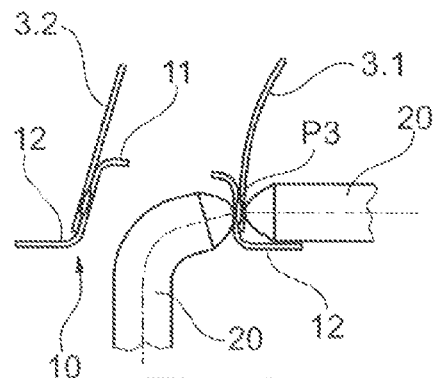
FIG. 6b shows the sectional view according to FIG. 6A with the assembly tool in a second position.

FIG. 6b shows a further arrangement of welding electrodes for welding a further wall portion together with the wheel installation strut 3a, 3b.

Figure 6C:
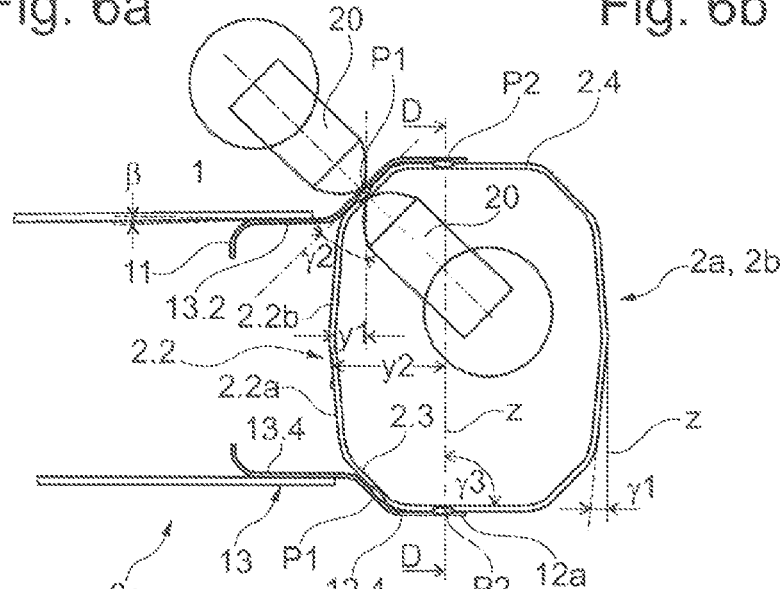
FIG. 6c shows a schematic sectional view according to the section C-C indicated in FIG. 4, with the assembly tool in a third position.

FIG. 6c shows a further arrangement of the welding electrodes for welding the flange 12 together with the side members 2a, 2b. Here, the wheel installation strut 3a, 3b already includes the structural component 10, which is arranged in a reinforced end or the hollow body 3e of the wheel installation strut. One of the welding electrodes or welding tongs is arranged within the side member 2a, 2b. Here, the side member 2a, 2b can come to lie against a bottom side of the flange 12. In this way, both the straps 12a as well as the flange portions 12.2, 12.4 can be welded together with the side member 2a, 2b. A flank 2.2 of the side member 2a, 2b includes two flank portions 2.2a, 2.2b, which are arranged at an angle γ1 to the xz-plane, i.e. to one another at an angle which is twice as large as the angle γ1. The angle γ1 is indicated, for the sake of better clarity, on the opposite side of the flank 2.2 but the side member 2a, 2b need not necessarily be embodied symmetrically. The subdivision of the flank 2.2 into two flank portions 2.2a, 2.2b arranged at an angle to one another supplies good stiffness of the side member in the transverse direction (y-direction).

A flank here is to mean a surface portion of the side member, which is located opposite the hollow body 3e and faces a wheel housing. If the side member for example is a profile that is octagonal in cross section with eight individual surface portions, the flank is formed by that surface portion which faces towards the wheel installation strut and is arranged closest to the wheel installation strut.

The wall of the pin 13 extends at an assembly angle β to the longitudinal axis Y. The assembly angle β is plotted in FIG. 6c between an axis, which is oriented parallel to the longitudinal axis Y, and an axis or plane arranged in a respective wall portion 13.2, 13.4. The assembly angle β can optionally also amount 0 degrees, but preferably, depending on the extension of the pin 13 in y-direction, is preferably in the range for example of 1 to 5 degrees. Because of this, plug-connecting up to a predetermined insertion depth can also take place without an additional shoulder or a butt edge being provided for this purpose.

The side member 2a, 2b on the one hand is connected (in each case in a plane which is not shown here) with its flank 2.2 assigned to the wheel installation strut to the first and third flange portion of the structural component 10, in addition to this, however, also to an offset butt face 2.3 and an offset upper and lower face 2.4. The offset butt face 2.3 is welded together with the second flange portion 12.2 and the fourth flange portion 12.4, and the offset upper and lower face 2.4 in each case is welded to one of the straps 12a. Two butt faces 2.3 are provided which extend in planes which intersect in the hollow body 3e. By way of the butt faces 2.3, transverse forces transversely to the longitudinal extension of the side member 2a, 2b can be absorbed or transmitted.

The points P1, P2, in which welding together takes place, are offset towards the inside in the direction of an engine centrally arranged in the region of the central longitudinal axis of the vehicle body (i.e. with this arrangement of the wheel installation strut this means against the y-direction). One or multiple of the points P1 arranged on the offset butt face 2.3 are offset by a first inner offset y1, and one or multiple of the points P2 arranged on the offset upper or lower face 2.4 are offset by a second inner offset y2. The points P1, P2 can for example be individual welding spots or part of a weld seam. Preferably, the second inner offset y2 has an amount which is in the range of half the width (extension in y-direction) of the side member. Because of this, good strength of the connection can be achieved. Optionally, the amount of the second inner offset y2 is also greater than half of the width of the side member, in particular in order to further increase the stability.

Figure 6D:
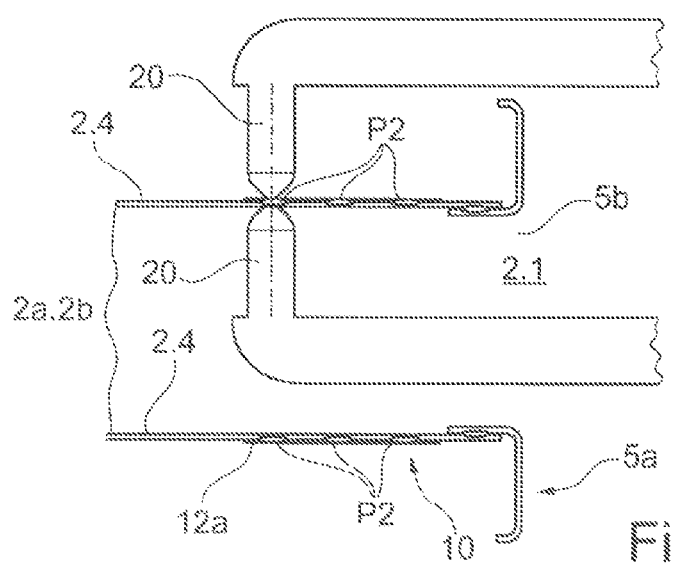
FIG. 6d shows a schematic sectional view according to the section B-B indicated in FIG. 5 with the assembly tool in a fourth position.

In FIG. 6d, it is shown that the flange or the straps 12a formed on the flange can be connected to the side member 2a, 2b via multiple welding spots P2, specifically on the offset upper or lower face 2.4. Through the multiple welding spots P2 which are spaced from one another in x-direction good stiffness or strength can be achieved, in particular also with respect to torsion about the y-axis of the indicated coordinate system. A welding electrode of the welding tool 20 engages through a front opening 2.1 of the side member 2a, 2b in such a manner that the side member 2a, 2b and the flange 12 of the structural component 10 are arranged between the two welding electrodes of the welding tool 20. This can also take place if on the side member 2a, 2b an anchor plate 5a is already provided. The anchor plate 5a is inserted into the side member 2a, 2b and has a passage 5b and can be fixed on the side member 2a, 2b by means of the welding electrodes, in particular after the side member 2a, 2b has been welded together with the structural component 10. The welding tool 5b can be guided through the passage 5b. Here it is not required to remove the welding tool but the anchor plate 5a can be directly welded on after the structural component 10 has been welded on.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A front structure of a vehicle body comprising:
    a side member flanking an interior of the front structure and having a side wall; and
    a wheel installation strut having an end welded at a plurality of attachment points to the side wall, wherein each of the plurality of attachment points has a surface normal which deviates from one another,
    wherein at least one attachment point of the plurality of attachment points is arranged on at least one of
      a top side of the side member,
      a bottom side of the side member, or
      a surface of the side member which is at least approximately oriented horizontally.

2. The front structure according to claim 1, wherein the side wall comprises a convex surface.

3. The front structure according to claim 1, wherein the at least one attachment point of the plurality of attachment points is offset relative the other one towards the interior.

4. The front structure according to claim 1, wherein the at least one attachment point of the plurality of attachment points is arranged on the top side of the side member.

5. The front structure according to claim 1, wherein at least one attachment point of the plurality of attachment points is arranged on the bottom side of the side member.

6. The front structure according to claim 1 wherein the at least one attachment point of the plurality of attachment points is arranged on the surface of the side member which is at least approximately oriented horizontally.

7. The front structure according to claim 1 wherein the wheel installation strut further comprises an elongated hollow body and a structural component with a flange.

8. The front structure according to claim 1, wherein the side member comprises a hydroformed part.

9. The front structure according to claim 1,
wherein the wheel installation strut further comprises a hollow body and a structural component plug-connected to the hollow body and having a flange fastened on a convex surface of the side member.

10. A front structure of a vehicle body comprising:
a side member flanking an interior of the front structure and having a side wall; and
a wheel installation strut having an end fastened at a plurality of attachment points to the side wall, wherein each of the plurality of attachment points has a surface normal which deviates from one another,
wherein the wheel installation strut further comprises a hollow body and a structural component plug-connected to the hollow body and having a flange fastened on a convex surface of the side member.

11. The front structure according to claim 10 wherein the flange comprises a plurality of flange portions with surfaces facing one another.

12. The front structure according to claim 11, wherein the structural component comprises a one-piece deep-drawn component.

13. The front structure according to claim 10, wherein the structural component further comprises a pin which is inserted into the hollow body.

14. The front structure according to claim 13, wherein the pin is formed cup-like with a bottom.

15. The front structure according to claim 14, wherein an opening is formed in the bottom of the pin.

16. A front structure of a vehicle body comprising:
a side member flanking an interior of the front structure and having a side wall:
a wheel installation strut having an end welded at a plurality of attachment points to the side wall wherein each of the plurality of attachment points has a surface normal which deviates from one another; and
an anchor plate disposed on an end of the side member and an inner hollow space of the side member is accessible through a passage of the anchor plate.

* * * * *